(12) United States Patent
Mizuno et al.

(10) Patent No.: US 6,634,033 B2
(45) Date of Patent: Oct. 21, 2003

(54) ROTATING DAMPER

(75) Inventors: Tsuyoshi Mizuno, Matsuo-machi (JP);
Kazuyoshi Oshima, Naruto-machi (JP);
Youjirou Nakayama, Yokoshiba-machi (JP)

(73) Assignee: Sugatsune Kogyo Co., Ltd. (JP)

( * ) Notice: Subject to any disclaimer, the term of this patent is extended or adjusted under 35 U.S.C. 154(b) by 0 days.

(21) Appl. No.: 10/182,416

(22) PCT Filed: Apr. 26, 2001

(86) PCT No.: PCT/JP01/03667
§ 371 (c)(1),
(2), (4) Date: Jul. 29, 2002

(87) PCT Pub. No.: WO02/36984
PCT Pub. Date: May 10, 2002

(65) Prior Publication Data
US 2003/0009819 A1 Jan. 16, 2003

(30) Foreign Application Priority Data
Oct. 30, 2000  (JP) ........................................ 2000-329818

(51) Int. Cl.$^7$ ................................................ A47K 13/04
(52) U.S. Cl. ........................................ 4/248; 188/305
(58) Field of Search ..................... 4/236, 248; 188/305, 188/316

(56) References Cited
U.S. PATENT DOCUMENTS 1,792,111 A * 2/1931 McNab .................. 188/305 X
1,813,069 A   7/1931 Morgan
5,906,010 A * 5/1999 Suzuki .......................... 4/236

FOREIGN PATENT DOCUMENTS

| JP | 1-86677 | 6/1989 |
| JP | 10-267064 A | 10/1998 |
| JP | 10-311359 A | 11/1998 |
| WO | WO 88/09885 A1 | 12/1988 |

* cited by examiner

Primary Examiner—Robert M. Fetsuga
(74) Attorney, Agent, or Firm—Eugene Stephens & Associates

(57) ABSTRACT

A cam member 5 is disposed within a first chamber R1 such that the cam member 5 is rotatable but non-movable in the axial direction. The cam member 5 is non-rotatably connected to a rotor 3 through a connection shaft portion 52 piercing into a piston 4. A second cam mechanism 10 is disposed between the cam member 5 and the piston 4. When the cam mechanism 7 causes the piston 4 to move from the second chamber R2 side to the first chamber R1 side in accordance with rotation of the rotor 3 in one direction, the second cam mechanism 10 allows the piston 4 to move from the second chamber R2 side to the first chamber R1 side by the same amount of movement. When the second cam mechanism 10 causes the piston 4 to move from the first chamber R1 side to the second chamber R2 side in accordance with rotation of the rotor 3 in the other direction, the cam mechanism 7 allows the piston 4 to move from the first chamber R1 side to the second chamber R2 side by the same amount of movement.

10 Claims, 6 Drawing Sheets

ROTATING DAMPER

TECHNICAL FIELD

This invention relates to a rotary damper which is disposed between a device main body and a rotary member rotatably supported on the device main body such as a main body of a toilet and its cover and adapted to prevent high-peed rotation of the rotary member in at least one direction, thereby rotating the rotary member at a reduced speed.

BACKGROUND ART

As a conventional rotary damper of this type, there is one, for example, which is disclosed in Japanese Patent Application Laid-Open No. H10-311359. This rotary damper includes a cylindrical casing having a closed bottom portion, a rotor fitted to an open side end portion of the casing such that the rotor is rotatable but non-movable in the axial direction, a piston disposed between the rotor and the bottom portion within the casing such that the piston is movable in the axial direction but non-rotatable, and a coiled spring (biasing means) for urging the piston against the rotor. The mating surfaces of the piston and rotor are each provided with a cam surface. Owing to this cam surface, when the rotor is rotated in one direction, the piston is moved from the second chamber side to the first chamber side. When the rotor is rotated in the other direction, the piston is moved from the first chamber side to the second chamber side by the coiled spring. Between the first chamber and the second chamber, there are defined a communication path capable of flowing a viscous fluid filled in each chamber almost without any resistance and an orifice (resistance path) capable of flowing the viscous fluid with a large resistance. The communication path is provided with a stop valve for opening/closing the path. This stop valve is arranged such that the valve is opened when the viscous fluid in the first chamber is flowed into the second chamber and the valve is closed when the fluid is flowed from the second chamber into the first chamber, for example.

In the rotary damper thus construction, when the piston is moved from the second chamber side to the first chamber side by the rotor which is rotated in one direction, the viscous fluid in the first chamber is going to flow into the second chamber. However, since the stop valve closes the communication path at that time, the viscous fluid in the first chamber is flowed into the second chamber through the orifice. As a result, high speed movement of the piston towards the first chamber side is prohibited, and hence, high speed rotation of the rotor is prohibited. On the contrary, when the piston is moved from the first chamber side to the second chamber side by the rotor which is rotated in the other direction, the viscous fluid in the second chamber is flowed into the first chamber. Since the stop valve opens the communication path at that time, the viscous fluid in the second chamber is flowed into the first chamber through the communication path almost without any resistance. Thus, the rotor can rotate at a high speed.

In case the conventional rotary damper is used in a toilet, a casing is non-rotatably connected to a toilet main body and the rotor is non-rotatably connected to a toilet cover, for example. In this case, the direction of rotation where high speed rotation of the rotor is prohibited is brought into alignment with the direction of closing rotation of the toilet cover. By installing the rotary damper in this way, when the toilet cover is to be closed, speed of rotation of the toilet cover is retrained to a low speed so that the toilet cover is prevented from hitting the toilet main body at a high speed, and when the toilet cover is to be opened, the cover can be rotated at a high speed.

When the rotor is rotated in the other direction (direction of rotation where high speed rotation is allowed), the piston is moved from the first chamber side to the second chamber side by the biasing force of the coiled spring. At that time, if the rotor is rotating at a low speed, the piston is moved to the second chamber side while maintaining a contacting state of the rotor against the cam surface. However, in case the rotor is rotated at a high speed in the other direction, high speed movement of the piston is prohibited by viscous resistance of the viscous fluid existing between an inner peripheral surface of the cylinder and an outer peripheral surface of the piston. As a result, the piston is occasionally spaced apart from the cam surface of the rotor nevertheless the piston is biased towards the rotor side by the coiled spring. When the rotor is rotated in one direction with the piston spaced apart from the rotor, the rotor can rotate without any resistance until the cam surface of the rotor comes into contact with the piston. For this reason, if a hand should be spaced apart from the toilet cover during the time the toilet cover is rotating in the opening direction at a high speed, for example, the toilet cover would be rotated in the closing direction at a high speed with such an inconvenient result that the toilet cover hits the toilet main body.

DISCLOSURE OF INVENTION

The present invention has been accomplished in order to solve the above-mentioned problem. The feature of the present invention resides in a rotary damper including a casing having a receiving hole, a rotor fitted to the receiving hole such that the rotor is non-movable in an axial direction thereof but rotatable, a piston inserted into the receiving hole between the rotor and a bottom portion of the receiving hole such that the piston is movable in the axial direction thereof but non-rotatable, and for defining the inside of the receiving hole into a first chamber on the bottom portion side and a second chamber on the rotor side, and viscous fluid filled in the first and second chambers, a cam mechanism for allowing movement of the piston from the second chamber side to the first chamber side when the rotor is rotated in one direction and for allowing movement from the first chamber side to the second chamber side when the rotor is rotated in the other direction being disposed between the rotor and the piston, wherein a cam member is disposed within the first chamber such that the cam member is non-movable in the axial direction of the receiving hole but rotatable, the cam member is non-rotatably connected to the rotor, a second cam mechanism for allowing movement of the piston from the second chamber side to the first chamber side by the cam mechanism when the rotor is rotated in one direction and for allowing movement of the piston from the first chamber side to the second chamber side when the rotor is rotated in the other direction is disposed between the rotor and the piston, and amounts of movement of the piston corresponding to rotation of the rotor by the second cam mechanism and the cam mechanism are set to be equal.

In this case, it is preferred that there are provided a communication path for flowing the viscous fluid without any resistance and a resistance path for flowing the viscous fluid with a predetermined value of resistance, between the first chamber and the second chamber, and a stop valve for opening the communication path when the viscous fluid flows in one direction within the communication path and for closing the communication path when the viscous fluid flows in the other direction within the communication path is disposed at the communication path. It is also preferred that the piston has a through hole formed in a central area thereof and extending in an axial direction thereof, and the rotor and the cam member are non-rotatably connected to each other through a connection shaft rotatably inserted into the through hole.

It is preferred that an adjustment member for adjusting a flow path area of the resistance path is disposed at the resistance path such that the adjustment member can be operated from outside. It is also preferred that the piston has a through hole formed in a central area thereof and extending therethrough in an axial direction thereof, and the rotor and the cam member are non-rotatably connected to each other through a connection shaft rotatably inserted into the through hole. It is also preferred that the resistance path includes a first hole extending through a central area of the cam member in an axial direction thereof, a second hole extending through a central area of the connection shaft in an axial direction thereof, and a lateral hole extending from the second hole to an outer peripheral surface of the connection shaft facing the second chamber, an insertion hole is formed in a central area of the rotor in such a manner as to extend therethrough in an axial direction thereof, and the adjustment member is inserted at least into the second hole from an external opening portion of the insertion hole.

It is preferred that the rotary damper further comprises inlet paths communicating with the first chamber or the second chamber from outside, and wherein the inlet paths are provided, in the form of a seal, with an amount adjusting member, whose insertion amount into the inlet paths can be operated from outside. It is also preferred that the piston has a through hole formed in a central area thereof and extending therethrough in an axial direction thereof, and the rotor and the cam member are non-rotatably connected to each other through a connection shaft rotatably inserted into the through hole. It is also preferred that the inlet paths includes a first hole extending through a central area of the cam member in an axial direction thereof, a second hole extending through a central area of the connection shaft in an axial direction thereof, and an insertion hole extending through a central area of the rotor in an axial direction thereof, and the amount adjusting member is inserted into the inlet path from an external opening portion of the insertion hole.

BEST MODE FOR CARRYING OUT THE INVENTION

Figures 1, 2:
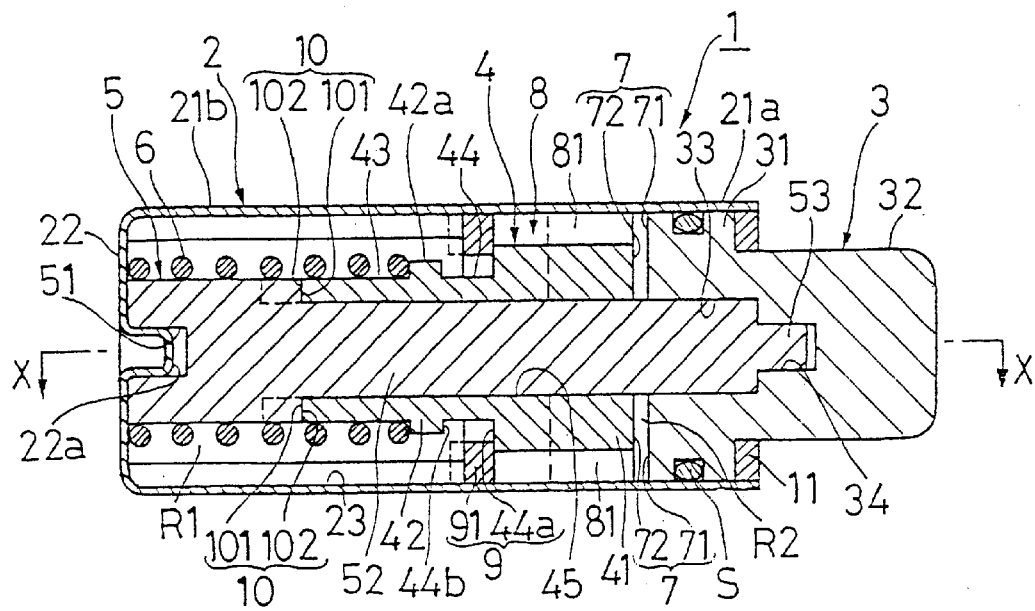
FIG. 1 is a sectional view showing a first embodiment of the present invention, wherein a piston is moved to the limit towards a second chamber side.
FIG. 2 is a sectional view taken on line X—X of FIG. 1.
Figure 3:
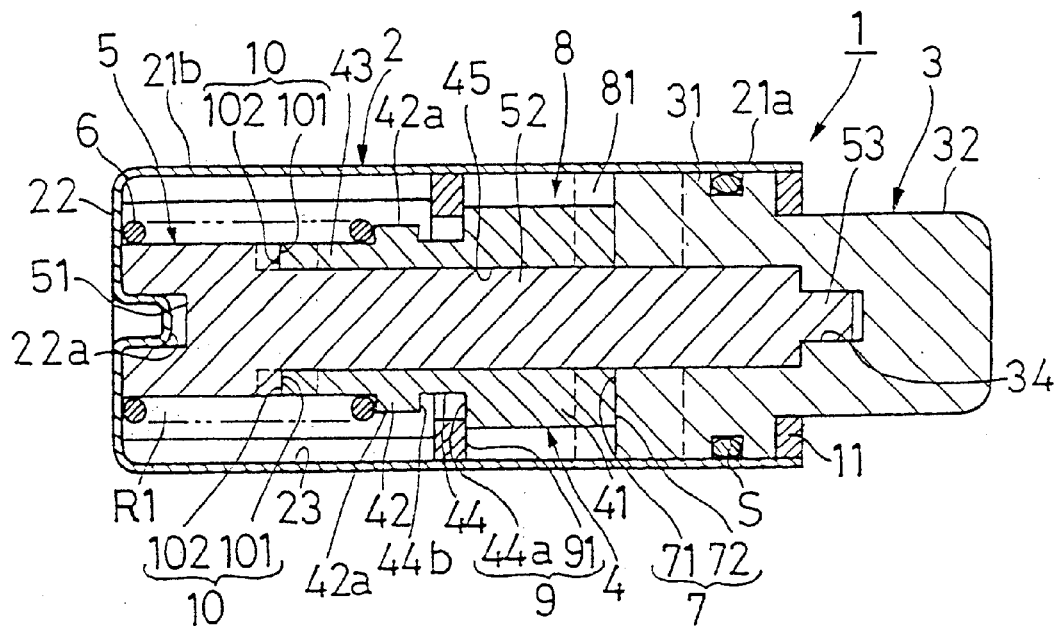
FIG. 3 is sectional view, like FIG. 1, but wherein the piston is moved to an intermediate position between a first chamber and the second chamber.
Figure 4:
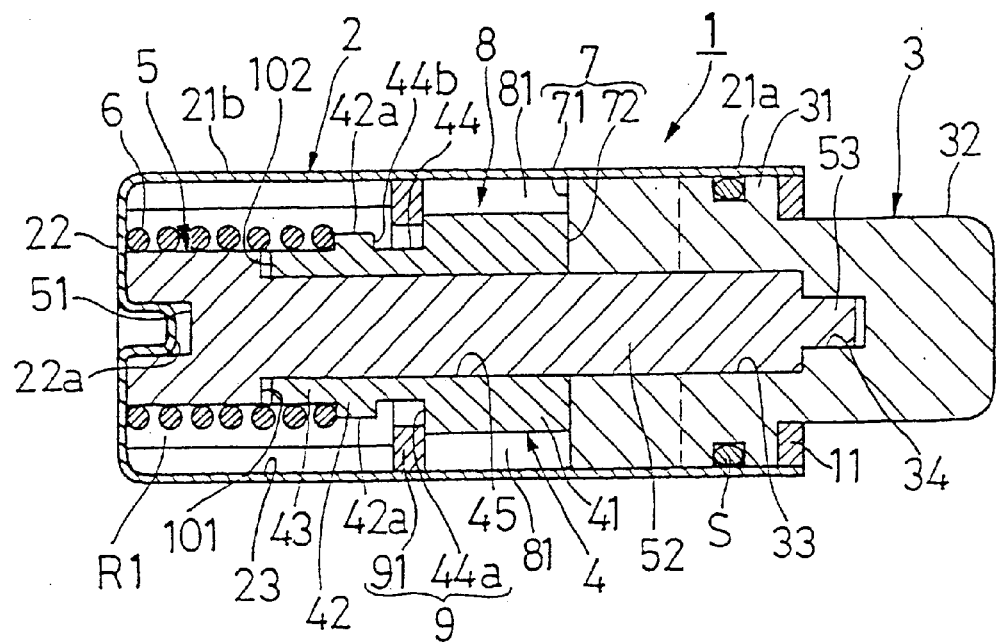
FIG. 4 is a sectional view, like FIG. 1, but wherein the piston is moved to the limit towards the first chamber side.
Figure 5:
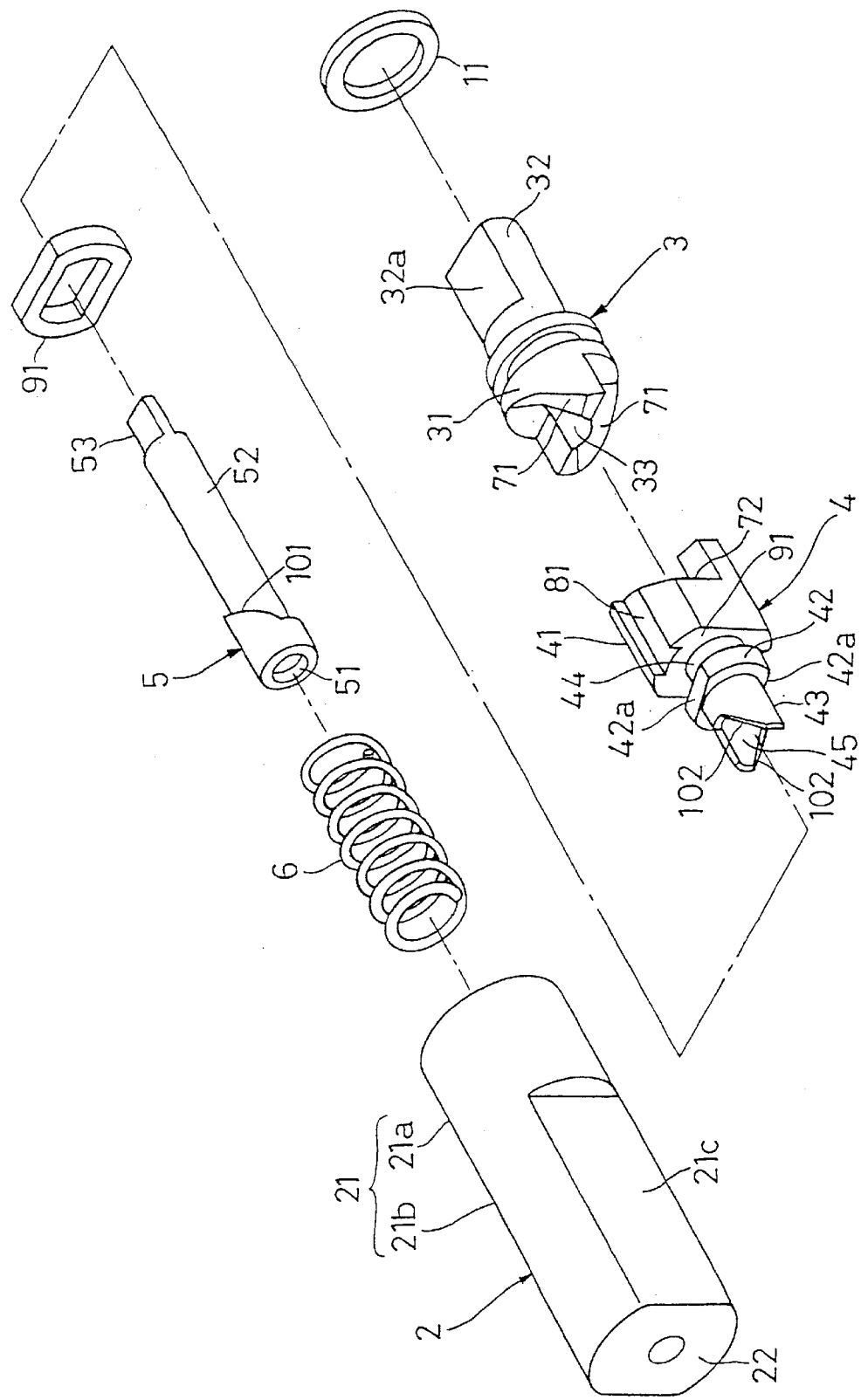
FIG. 5 is an exploded perspective view of the above-mentioned first embodiment.

Several embodiments of the present invention will be described hereinafter with reference to FIGS. 1 through 10.

FIGS. 1 through 5, show a first embodiment of the present invention. A rotary damper 1 includes, as chief component elements, a casing 2, a rotor 3, a piston 4, a cam member 5 and a coiled spring 6. One of the casing 2 and the rotor 3 is non-rotatably connected to a device main body such as a toilet main body, and the other is non-rotatably connected to a rotary body such as a toilet cover.

The casing 2 is of a cylindrical configuration having a bottom portion. The casing 2 includes a cylindrical portion 21 and a bottom portion 22 for closing an opening portion at one end of the casing 2. The cylindrical portion 21 comprises a circular cylindrical portion 21a on the opening portion side, and a flat cylindrical portion 21b on the bottom portion 22 side. The circular cylindrical portion 21a is of a circular configuration in section. The inside diameter and the outside diameter of the circular cylindrical portion 21a are constant. The flat cylindrical portion 21b is formed in an elongated circular configuration whose opposite sides are flat, by being formed in a same sectional configuration as the circular cylindrical portion 21a and thereafter, press molding opposite side portions, which are 180 degrees away from each other in the circumferential direction, into two flat portions 21c, 21c. The flat cylindrical portion 21b is non-rotatably connected to the device main body or rotary body. The inside of the cylindrical portion 21 is defined as a receiving hole 23. Accordingly, an inner peripheral surface of the receiving hole 23 is of a circular configuration in section at an area corresponding to the circular cylindrical portion 21 but it is of an elongated circular configuration in section having a flat surface portion at each of the opposite sides, at an area corresponding to the flat cylindrical portion 21b. The bottom portion 22 has a supporting projection 22a formed at a central area thereof and projecting inwards on an axis of the receiving hole 23.

The rotor 3 includes a rotor portion 31 and a connection shaft portion 32 whose axes are aligned with each other. The rotor portion 31 is rotatably fitted to an inner periphery of the circular cylindrical portion 21a of the casing 2 and is prevented from coming off by a retaining ring 11 which is fixedly fitted to the end portion on the opening side of the circular cylindrical portion 21a. The space between the outer peripheral surface of the rotor portion 31 and the inner peripheral surface of the circular cylindrical portion 21 is sealed with a seal member S such as an O-ring. The connection shaft portion 32 is projected outside from the casing 2, and two flat surface portions 32a, 32a are formed on the projected part in such a manner as to be 180 degrees away from each other in the circumferential direction. The connection shaft portion 32 is non-rotatably connected to the device main body or rotary body.

The piston 4 includes a slide portion 41, a lock portion 42 and a cam portion 43 which are formed in order from the rotor 3 side towards the bottom portion 22 side. The slide portion 41 has a generally same sectional configuration as the inside of the flat cylindrical portion 21b, and most part of the slide portion 41 on the bottom portion 22 side is slidingly movably fitted to the flat cylindrical portion 21b. Owing to this arrangement, the piston 4 is received in the receiving hole 23 such that it is unable to rotate but movable in the axial direction. The lock member 42 is of a plate-like configuration capable of being inserted into the flat cylindrical portion 21b. The lock member 42 has flat surface notch portions 42a, 42a which are formed in opposite side portions facing the direction generally orthogonal to the two flat portions 21c, 21c of the, flat cylindrical portion 21b. Owing to this arrangement, the lock portion 42 is formed in an elongated configuration, as a whole, whose opposite sides are flat. An annular recess 44 is formed in the end portion of the lock portion 42 which is in contact with the slide portion 41. The diameter of a bottom portion of the annular recess 44 is smaller than an interval between the flat surface notch portions 42a, 42a. The cam portion 43 is formed in a circular configuration in section. The outside diameter of the cam portion 43 is generally same as or slightly smaller than the interval between the flat surface notch portions 43a, 43a.

A cam mechanism 7 is disposed between confronting surfaces of the rotor portion 31 of the rotor 3 and the slide portion 41 of the piston 4. The cam mechanism 7 comprises a pair of cam surfaces 71, 71 formed on the confronting surface of the rotor 31 with respect to the slide portion 41, and a pair of cam surfaces 72, 27 formed on the confronting surface of the slide portion 41 with respect to the rotor portion 31. The cam surfaces 71, 72 are in contact with each other. When the rotor 3 is rotated in one direction, the piston 4 is moved from the rotor 3 side to the bottom portion 22 side. As later described, the movement of the piston 4 from the bottom portion 22 side to the rotor 3 side is conducted by a second cam mechanism 10.

Because the slide portion 41 of the piston 4 is slidingly movably fitted to the flat cylindrical portion 21b, the inside of the casing 2 inside of the receiving hole 23 between the bottom portion 22 and the rotor 3 is divided into a first chamber R1 on the bottom portion 22 side and a second chamber R2 on the rotor 3 side. The respective chambers R1, R2 are filled with viscous fluid not shown. The first chamber R1 and the second chamber R2 are communicated with each other through the communication path 8, That is, on the outer peripheral surface of the slide portion 41 of the piston 4, two communication grooves 81 extending from one end thereof to the other end in the axial direction are formed. Accordingly, one end portion (end portion on the rotor 3 side) of each communication groove 81 is normally communicated with the second chamber R2 and the other end portion thereof is in communication with the annular recess 44. Moreover, the annular recess 44 is in communication with the first chamber R1 through a gap formed between the flat surface notch portion 42a formed on the outer peripheral surface of the lock portion 42 and the inner peripheral surface of the flat cylindrical portion 21b. Accordingly, the first and second chambers R1, R2 are in communication with each other through the gap formed between the flat surface notch portion 42a and the inner peripheral surface of the flat cylindrical portion 21b, the annular recess 44 and the communication grooves 81, and the communication path 8 is defined by them. The communication path 8 has such a sectional area that the viscous fluid can flow almost without any substantial resistance at any place.

The communication path 8 is opened and closed by a stop valve 9. The stop valve 9 includes a valve body 91. The sectional configuration of the inner peripheral surface of the valve body 91 is generally same as that of the lock portion 42. Accordingly, the cam portion 43 and the lock portion 42 can be inserted into the valve body 91, and when the cam portion 43 and the lock member 42 pass through the valve body 91, the inner peripheral surface of the valve body 91 is brought into opposing relation to the annular recess 44. In that condition, when the valve body 91 is rotated about 90 degrees with respect to the lock portion 42, the long-axis direction of the valve body 91 and the long-axis direction of the lock portion 42 are generally orthogonal to each other, while the short-axis direction of the valve body 91 is generally aligned with the long-axis direction of the lock portion 42. As a result, the lock portion 42 becomes unable to pass through the valve body 91 and the valve body 91 is prohibited from moving to the bottom portion 22 side by the lock portion 42.

The sectional configuration of the outer periphery of the valve body 91 is generally same as that of the flat cylindrical portion 21b. Moreover, in a state where the valve body 91 is rotated 90 degrees after the lock portion 42 is passed through the valve body 91, the attitude of the valve body 91 is same as that of the slide portion 41. Accordingly, the valve body 91 can be inserted into the flat cylindrical portion 21b together with the slide portion 41 and fitted into the flat cylindrical portion 21b such that the valve body 91 is non-rotatable but slidingly movable. Hence, the valve body 91 maintains its attitude where the body 91 is rotated 90 degrees with respect to the lock portion 42 and therefore, when the valve body 91 is moved to the bottom portion 22 side, it unavoidably hits the lock portion 42. This prohibits the movement of the valve body 91 to the bottom portion 22 side.

The thickness of the valve body 91 is smaller than the width of the annular recess 44. Accordingly, the valve body 91 can move in the axial direction by an amount equal to the difference between the thickness of the valve body 91 and the width of the annular recess 44. That is, the valve body 91 can move between the opposite side surfaces 44a, 44b of the annular recess 44. When the viscous fluid within the first chamber R1 is going to flow to the second chamber R2 side through the communication path 8, the valve body 91 is pushed by the viscous fluid to hit the side surface 44a on the slide portion 41 side of the annular recess 44. On the contrary, when the viscous fluid within the second chamber R2 is going to flow to the first chamber R1 side through the communication path 8, the valve body 91 is pushed by the viscous fluid to hit the side surface 44b on the lock portion 42 side of the annular recess 44.

The side surface 44a of the annular recess 44 serves as a valve seat of the stop valve 9. When the valve body 91 hits the side surface 44a, the opening portion at one end of the valve body 91 is blocked with the side surface 44a. Moreover, as previously mentioned, the outer periphery of the valve body 91 is same as the sectional configuration of the inner periphery of the flat cylindrical portion 21b, and also same as the sectional configuration of the slide portion 41 only excepting the communication grooves 81. Accordingly, in a state where the valve body 91 hits the side surface 44a, the end portion of the communication path 81 facing the annular recess 44 is blocked with the valve body 91 and the space between the communication grooves 81 and the annular recess 44 is blocked with the valve body 91. By this, the communication path 8 is closed. That is, the stop valve 9 is closed. As a result, the viscous fluid within the first chamber R1 becomes unable to flow into the second chamber R2 through the communication path 8.

However, since the piston 4 and the valve body 91 are slidingly moved on the inner periphery of the flat cylindrical portion 21b, fine gaps are inevitably formed between the respective outer peripheral surfaces of the piston 4 and the valve body 91 and the inner peripheral surface of the flat cylindrical portion 21b. A fine gap is also inevitably formed between a connection shaft 52, as later described and a through hole 45, as later described, of the piston 4. When the stop valve 9 is in a closed position, the viscous fluid within the first chamber R1 is flowed into the second chamber R2 through the fine gaps. However, the viscous fluid is encountered with a large flowing resistance when it passes through the fine gaps. As apparent from this, in the rotary damper 1 of this embodiment, fine gaps for intercommunicating the first chamber R1 and the second chamber R2 are utilized as a resistance path. It is, of course, accepted that the piston 4 or the valve body 91 is provided with a communication hole, which has an orifice, for intercommunicating the first and second chambers R1, R2, and then, this communication hole is used as a resistance path.

On the other hand, when the valve body 91 hits the side surface 44b of the annular recess 44, the communication grooves 81 are in communication with the annular recess 44. Moreover, since the dimension of the inner peripheral surface of the valve body 91 in the long-axis direction is larger than the distance between the flat surface notch portions 42a, 42a of the lock portion 42, a gap is formed between the flat surface notch portion 42a and the inner peripheral surface of the valve body 91. Through this gap and through the gap between the flat surface notch portion 42a and the inner surface of the flat cylindrical portion 21b, the annular recess 44 is communicated with the first chamber R1. Accordingly, when the valve body 91 hits the side surface 44b, the stop valve 9 is brought into an open position to open the communication path 8. Hence, the viscous fluid within the second chamber R2 can flow into the first chamber R1 without any substantial resistance.

The cam member 5 is inserted into the casing 2 at an area on the bottom portion 22 side with its axis aligned with that of the casing 2. One end face of the cam member 5 is in abutment with the bottom portion 22. This end face has a supporting hole 51 formed in a central area thereof. This supporting hole 51 is for a supporting projection 22a to be relatively rotatably fitted therein. The other end face of the cam member 5 has a connection shaft portion (connection shaft) 52 formed on a central area thereof. This connection shaft portion 52 extends on the axis of the casing 2. The connection shaft portion 52 is rotatably pierced through a through hole 45 formed in a central area of the piston 4 and inserted in a connection hole 33 formed in a central area of the rotor 3. A front end face of the connection shaft portion 52 is in abutment with the bottom surface of the connection hole 33. Accordingly, the rotor 3 and the cam member 5 are sandwichingly held by the bottom portion 22 and the retaining ring 11. By this, the rotor 3 and the cam member 5 are non-movable in the axial direction. A plate portion 53 is formed on a front end portion of the connection shaft portion 52. This plate portion 53 is non-rotatably inserted in a driving hole portion 34 formed in the bottom surface of the connection hole 33. By this, the cam member 5 is non-rotatably connected to the rotor 3 so that the cam member 5 rotates in unison with the rotor 3.

The second cam mechanism 10 is disposed between the confronting surfaces between the cam member 5 and the cam portion 43 of the piston 4. This cam mechanism 10 comprises a pair of cam surfaces 101, 101 formed on confronting surfaces of the cam member 5 with respect to the cam portion 43, and a pair of cam surfaces 102, 102 formed on confronting surfaces of the cam portion 43 with respect to the cam member 5. The cam surfaces 101, 102 are contacted with each other. When the cam member 5 is rotated in unison with the rotor 3, the second cam mechanism 10 moves the piston 4 by the same amount in the same direction as the cam mechanism 7does. That is, at the time the rotor 3 and the cam member 5 are rotated in one direction, the cam mechanism 7 causes the piston 4 to move from the second chamber R2 side to the first chamber R1 side. At that time, the second cam mechanism 10 merely allows the piston 4 to move in the same direction. When the rotor 3 and the cam member 5 are rotated in the other direction, the second cam mechanism 10 causes the piston 4 to move from the first chamber R1 side to the second chamber R2 side. At that time, the cam mechanism 7 merely allows the piston 4 to move in the same direction.

A coiled spring 6 as biasing means is disposed within the casing 2 between the bottom portion 22 and the piston 4. This coiled spring 6 is for biasing the piston 4 from the first chamber R1 side to the second chamber R2 side. As previously mentioned, the piston 4 is moved in the same direction by the cam mechanism 10. Accordingly, the coiled spring 6, as an auxiliary member of the second cam mechanism 10, biases the piston 4 to the second chamber R2 side and is not absolutely necessary. However, since the cam member 5 and the cam portion 43 are small in outside diameter, the cam surfaces 101, 101 are liable to be worn out quickly when large loads are applied thereto. In order to prevent such inconveniences, it is preferable to employ the coiled spring 6.

In the rotary damper 1 thus constructed, when the rotor 3 and the cam member 5 are rotated in one direction, the cam mechanism 7 causes the piston 2 to move from the second chamber R2 side to the first chamber R1 side. Then, the viscous fluid within the first chamber R1 is going to flow into the second chamber R2 through the communication path 8. However, the valve body 91 of the stop valve 9 is pushed by the viscous fluid to sits on the side surface 44a, as a valve seat, of the annular recess 44. As a result, the stop valve 9 is closed to block the communication path 8. Accordingly, the speed of rotation of the rotor 3 is restrained to a low speed. At that time, the second cam mechanism 10 allows the piston 4 to move in the same direction while maintaining the contacting relation between the cam surfaces 101, 102.

When the rotor 3 and the cam member 5 are rotated in the other direction, the second cam mechanism 10 causes the piston 4 to move from the first chamber R1 side to the second chamber R2 side. Then, the viscous fluid within the second chamber R2 is going to flow to the first chamber R1 side through the communication path 8. The valve body 91 is moved away from the side surface 44a by this viscous fluid and the stop valve 9 is brought into an open position. Accordingly, the viscous fluid within the second chamber R2 is flowed into the first chamber R1 through the communication path 8 without any substantial resistance. Hence, high speed rotation of the rotor 3 is allowed.

As apparent from the foregoing description, in the rotary damper 1, since the movement of the piston 4 from the first chamber R1 side to the second chamber R2 side is conducted by the second cam mechanism 10, the piston 4 would not be spaced apart from the rotor 3 even if the rotor 3 should be rotated at a high speed in the other direction. In other words, the cam surfaces 71, 72 of the cam mechanism 7 are maintained in a normally contacted position. Accordingly, when the rotor 3 is rotated in one direction immediately after it is rotated in the other direction, the high speed rotation of the rotor 3 is immediately prohibited by resistance of the viscous fluid as soon as the rotor 3 is rotated in one direction. Hence, in case the rotary damper 1 is disposed between the toilet main body and the toilet cover, the toilet cover is prevented from hitting the toilet main body at a high speed.

Another embodiment of the present invention will now be described. With respect to the embodiment to be described hereinafter, only the construction different from the above-mentioned embodiment will be described. Those parts, which are same as the first embodiment, are denoted by same reference numeral and description thereof is omitted.

Figure 6:
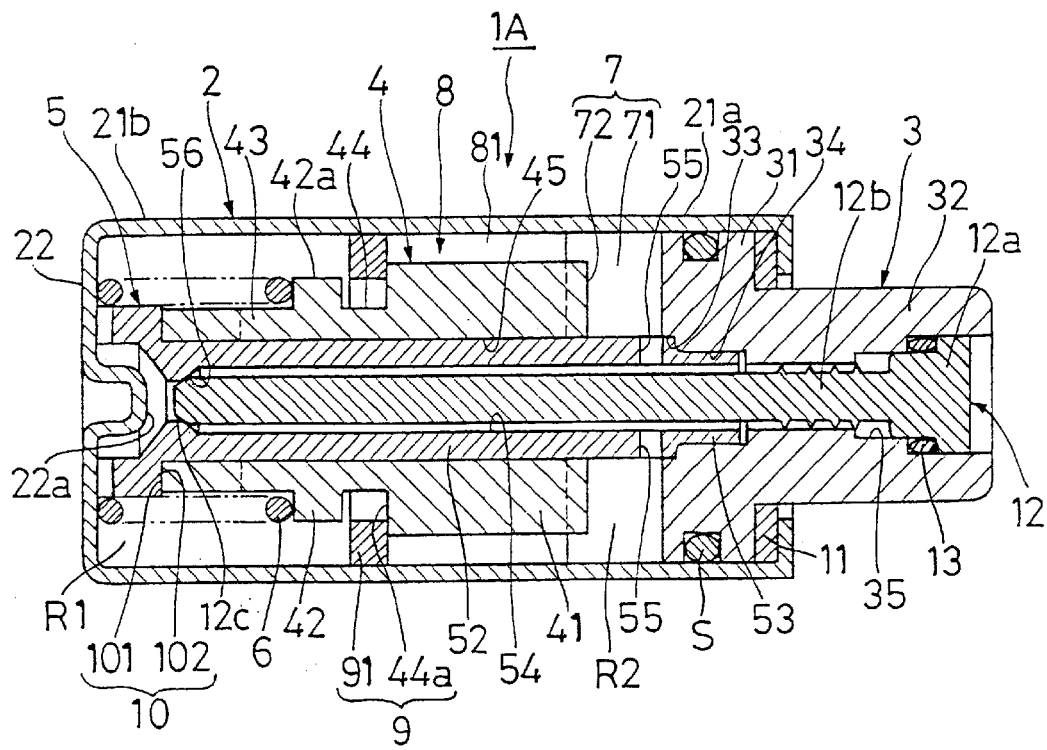
FIG. 6 is a sectional view showing a second embodiment of the present invention, wherein an amount adjusting member sits on a valve seat.
Figure 7:
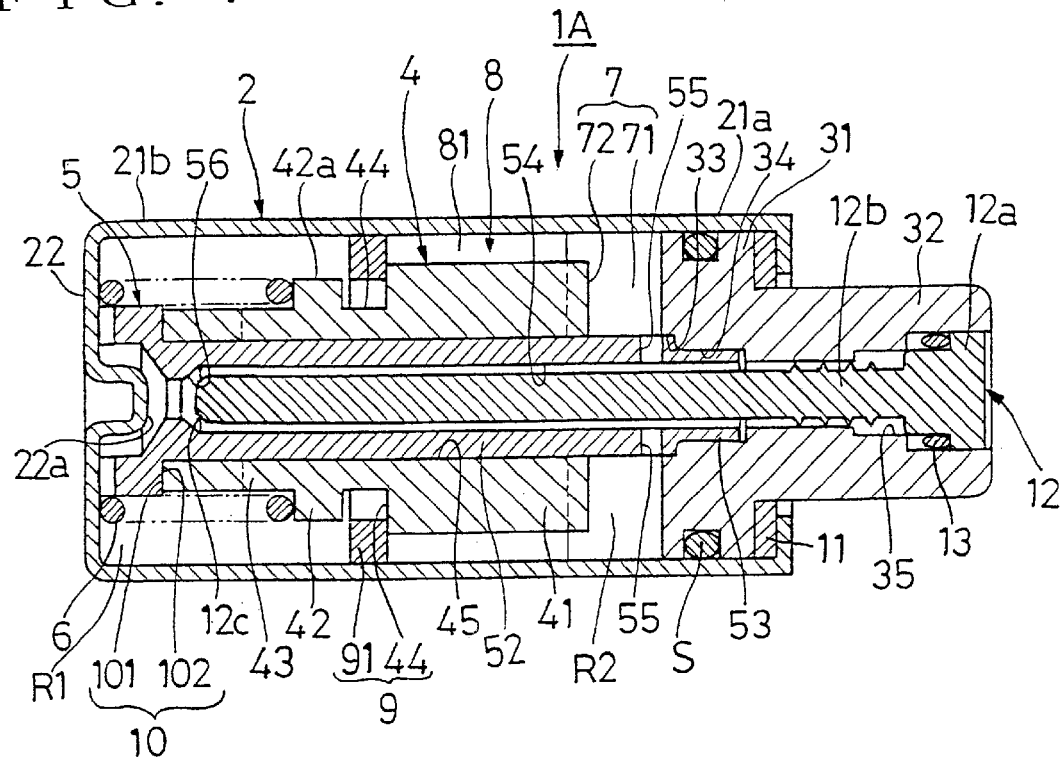
FIG. 7 is a sectional view, like FIG. 6, but wherein the amount adjusting member is spaced apart from the valve seat.
Figure 8:
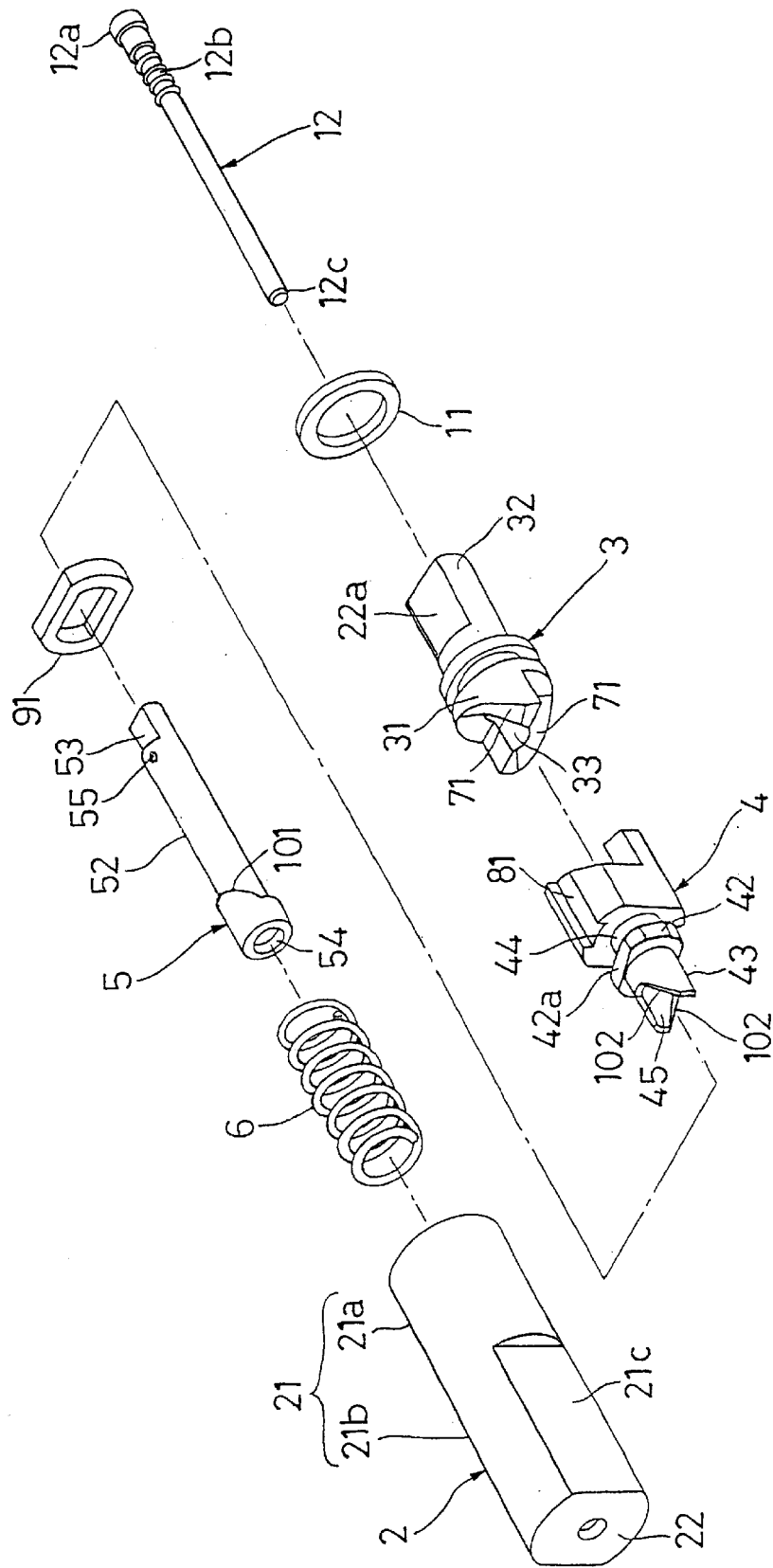
FIG. 8 is an exploded perspective view of the above-mentioned second embodiment.

FIGS. 6 through 8 show a second embodiment of the present invention. In the rotary damper 1A of this second embodiment, a vertical hole (first and second holes) 54 is formed in a cam member 5 such that the vertical holes 54 extends on the axis of the cam member 5. The vertical hole 54 extends through the cam member 5. Accordingly, one end portion (left end portion in FIG. 6) of the vertical hole 54 is in communication with a first chamber R1. A lateral hole 55 is formed in a connection shaft portion 52 of the cam member 5. One end of the lateral hole 55 is open at an inner peripheral surface of the vertical hole 54 and the other end is open an outer peripheral surface of the connection shaft portion 52 facing the second chamber R2. Accordingly, the first and the second chambers R1, R2 are communicated with each other through the vertical hole 54 and the lateral hole 55. A tapered valve seat 56 is formed on an end portion of the vertical hole 54 on the side of the first chamber R1.

An insertion hole 35 is formed in the rotor 3 such that the hole 35 extends on the axis of the rotor 3. One end (right end in FIG. 6) of the insertion hole 35 is open at an outer surface of the rotor 3. The other end of the insertion hole 35 is open at a bottom surface of the driving hole 34 and is in communication with the vertical holes 54 through the driving hole 34 and the communication hole 33. A shaft-like adjustment member 12 is slidingly movably inserted into the insertion hole 35. A space between an outer peripheral surface of a head portion 12a of the adjustment member 12 and an inner peripheral surface of the insertion hole 34 is sealed with a seal member 13 such as an O-ring. Accordingly, the viscous fluid is not leaked out between the outer peripheral surface of the head portion 12a and the inner peripheral surface of the insertion hole 35. The adjustment member 12 has a threaded portion 12b at an inner area thereof than the head portion 12a. This threaded portion 12b is threadingly engaged with the insertion hole 35. Accordingly, by rotationally operating the head portion 12a of the adjustment member 12 from outside, the adjustment member 12 can be advanced and retracted in the axial direction of the insertion hole 35.

A portion of the adjustment member 12 located more on the front end side than the threaded portion 12b has a smaller diameter than the inside diameter than the vertical hole 54 and is inserted in the vertical hole 54 with a space. A valve portion 12c is formed on the front end portion of the adjustment member 12. When the head portion 12a of the adjustment member 12 is moved to a predetermined position towards the inner side of the insertion hole 35, the valve portion 12c sits on the valve seat 56. When the valve portion 12c sits on the valve seat 56, a space between the portion of the vertical hole 54 on the first chamber R1 side and the portion of the vertical hole 54 on the second chamber R2 side is blocked with the valve portion 12c. Accordingly, the viscous fluid does not flow through the vertical holes 54 nor the lateral hole 55. On the other hand, when the valve portion 12c is brought away from the valve seat 56 towards the second chamber 2R side, the viscous fluid within the first chamber R1 flows into the second chamber R2 through the vertical hole 54 and the lateral hole 55. At that time, the viscous fluid is encountered with an amount of flowing resistance which amount corresponds to an interval between the valve seat 56 and the valve portion 12c. The speed of rotation of the rotor 3 in one direction is restricted by the flowing resistance against the viscous fluid. Accordingly, the speed of rotation of the rotor 3 in one direction can be adjusted by adjusting the interval between the valve seat 56 and the valve portion 12c.

As apparent from the foregoing description, a resistance path is formed by the vertical hole 54, the lateral hole 55, the valve seat 56 and the valve portion 12c. Since the viscous fluid within the second chamber R2 flows into the first chamber R1 through the communication path 8, it is not encountered with a large flowing resistance even when the valve portion 12c sits on the valve seat 56.

In the rotary damper 1A thus constructed, when the rotor 3 is rotated in one direction to cause the piston 4 to move from the second chamber R2 side to the first chamber R1 side, the viscous fluid within the first chamber R1 is going to flow into the second chamber R2 through the vertical hole 54 and the lateral hole 55, as the resistance path. At that time, if the valve portion 12c sits on the valve seat 56, the vertical hole 54 is blocked with the valve portion 12c and therefore, the viscous fluid within the first chamber R1 cannot pass the vertical hole 54. Accordingly, the viscous fluid within the first chamber R1 flows into the second chamber R2 through the gaps inevitably formed in the respective parts between the first chamber R1 and the second chamber R2 as in the above-mentioned first embodiment. Hence, the viscous fluid is encountered with a large flowing resistance. The high speed rotation of the rotor 3 is prohibited by this. On the other hand, when the valve portion 12c is spaced apart from the valve seat 56 towards the second chamber R2 side, the viscous fluid within the first chamber R1 passes through the interval between the valve seat 56 and the valve seat 12c and flows into the second chamber R2 through the vertical hole 54 and the lateral hole 55, Accordingly, in that case, the flowing resistance received by the viscous fluid is reduced by an amount equal to the viscous fluid in the first chamber R1 which flows passing through the vertical hole 54 and the lateral hole 55, and the rotor 3 can rotate at a high speed to that extent. The speed of rotation of the rotor 3 can be adjusted by adjusting the interval between the valve seat 56 and the valve portion 12c.

In case the rotor 3 is rotated in the other direction and the piston 4 is moved from the first chamber R1 side to the second chamber R2 side, the viscous fluid within the second chamber R2 flows into the first chamber R1 through the communication path 8 as in the above-mentioned first embodiment. Of course, when the valve portion 12c is spaced apart from the valve seat 56, a part of the viscous fluid within the second chamber R2 flows into the first chamber R1 through the lateral hole 55 and the vertical hole 54. Accordingly, the rotor 3 can rotate at a higher speed.

Figure 9:
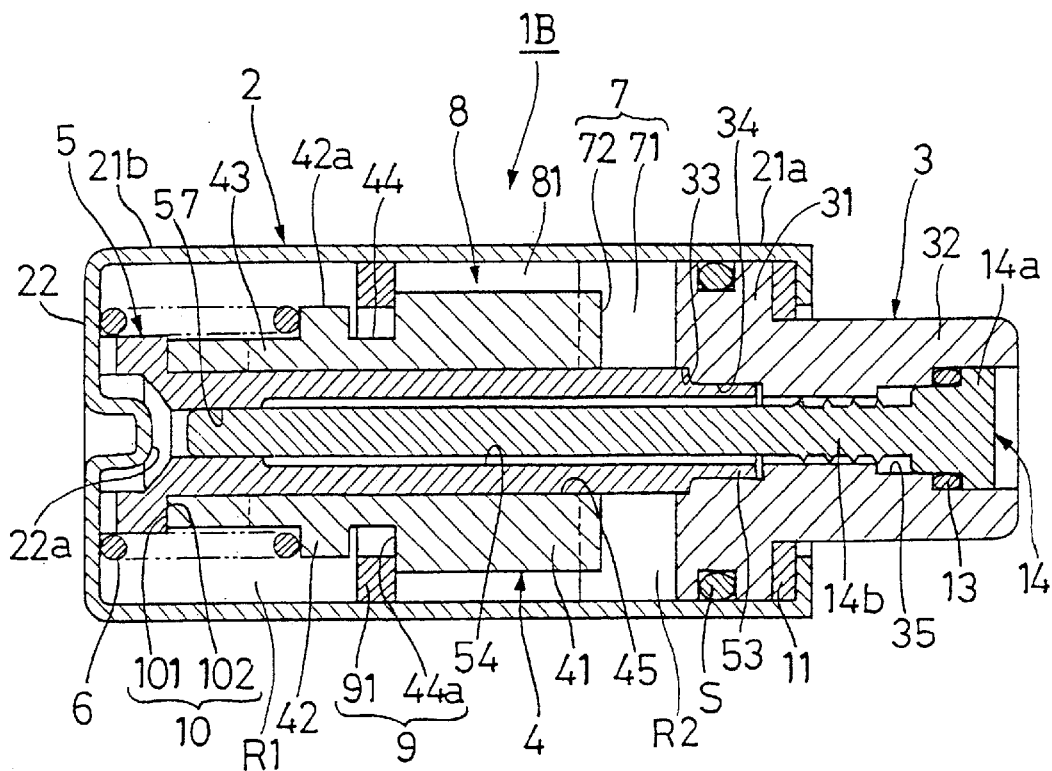
FIG. 9 is a sectional view showing a third embodiment of the present invention, wherein a pressing amount of an amount adjusting member is comparatively large.
Figure 10:
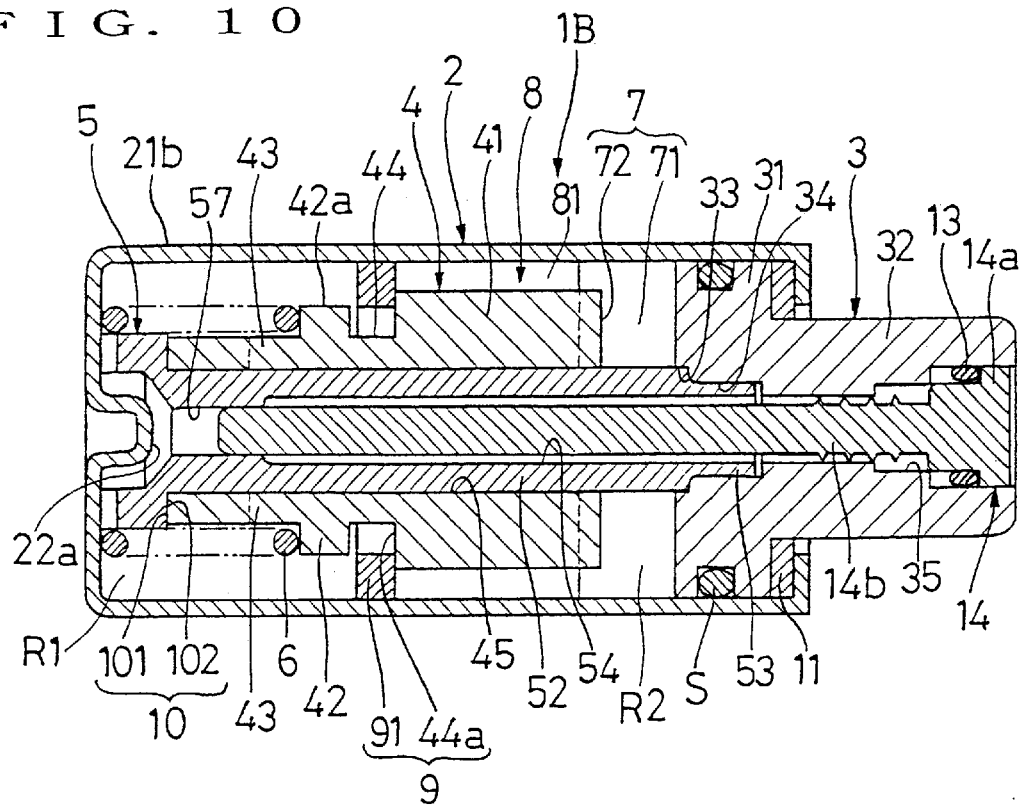
FIG. 10 is a sectional view, like FIG. 9, but wherein a pressing amount of the amount adjusting member is comparatively small.

FIGS. 9 and 10 show a third embodiment of the present invention. In a rotary damper 1B of this third embodiment, instead of the valve seat 56 of the second embodiment, a reduced-diameter hole portion 57 is formed in an inner peripheral surface of a vertical hole 54. A front end portion of an amount adjusting member 14 is slidingly movably fitted to this reduced-diameter hole portion 57. The amount adjusting member 14 is formed in the same manner as the adjustment member 12 only excepting that the valve portion 12c is not formed. A head portion 14a is sealed with an inner peripheral surface of an insertion hole 35 through a seal member 13, and a threaded portion 14b is threadingly engaged with the insertion hole 35.

In the rotary damper 1B of this third embodiment, by removing the amount adjusting member 14, the viscous fluid can be introduced into a first chamber R1 through the insertion hole 35 and a vertical hole 54 and the viscous fluid can also be introduced from the first chamber R1 to the second chamber R2. An inlet path is formed by the insertion hole 35 and the vertical hole 54. Error tends to occur to the amounts of viscous fluid introduced into the first and second chambers R1, R2 depending on each rotary damper. Such error can be compensated by an amount of insertion of the amount adjusting member 14 into the reduced-diameter hole portion 57. That is, in case the filling amounts of viscous fluid into the first and second chambers R1, R2 are small, it suffices that the amount of insertion of the amount adjusting member 14 into the reduced-diameter hole portion 57 is increased as shown in FIG. 9. In case the filling amounts of viscous fluid is large, it suffices that the amount of insertion of the amount adjusting member 14 into the reduced-diameter hole portion 57 is decreased as shown in FIG. 10.

It should be noted that the present invention is not limited to the above-mentioned embodiments but that many changes and modifications can be made in accordance with necessity.

For example, in the above embodiments, although the first and second chambers R1, R2 are communicated with each other through the communication path 8 and the communication path 8 is opened and closed by the stop valve 9, the first and second chambers R1, R2 may be communicated with each other only through the resistance path without employing the communication path 8 and the stop valve 9. In that case, the high speed rotation is prohibited irrespective of the direction of rotation of the rotor. Especially, when no communication path 8 is employed in the second embodiment where the resistance path is formed by the vertical hole 54, the lateral hole 55, the valve seat 56 and the valve portion 12c, the speed of rotation of the rotor 3 can be adjusted by adjusting the interval between the valve seat 56 and the valve portion 12c, irrespective of the direction of rotation of the rotor 3.

Moreover, in the above embodiments, the connection shaft portion 52 is disposed on the cam member 5, this connection shaft portion 52 is pierced through the piston 4 and non-rotatably connected to the rotor 3. It is also accepted that the connection shaft portion is disposed on the rotor 3, and the connection shaft portion 52 is pierced through the piston 4 and non-rotatably connected to the cam member 5. It is also an interesting alternative that the connecting shaft portion 52 is formed separately from the cam member 5 and the rotor 3, and opposite end portions of the connecting shaft portion 52 are non-rotatably connected to the cam member 5 and the rotor 3.

Moreover, in the above embodiments, although the cam mechanism 7 is formed by the cam surface 71 formed on the rotor 3 and the cam surface 72 formed on the piston 4, it is also accepted that a cam surface is formed on one of the rotor 3 and the piston 4, and a projection to be abutted with the cam surface is formed on the other. The same can be applicable to the second cam mechanism 10.

INDUSTRIAL APPLICABILITY

A rotary damper according to the present invention is useful as a rotary damper which is disposed between a device main body and a rotary body rotatably supported thereon, such as a toilet main body and a toilet cover and which is adapted to prevent high speed rotation of the rotary body at least in one direction so that the rotary body can rotate at a low speed. It is especially suited to be used for surely prohibiting high-speed rotation of the rotary body in one direction.

We claim:

1. A rotary damper including a casing (2) having a receiving hole (23), a rotor fitted to said receiving hole (23) such that said rotor is non-movable in an axial direction thereof but rotatable, a piston (4) inserted into said receiving hole (23) between said rotor (3) and a bottom portion (22) of said receiving hole (23) such that said piston (4) is movable in the axial direction thereof but non-rotatable, and for defining the inside of said receiving hole (23) into a first chamber (R1) on said bottom portion (22) side and a second chamber (R2) on said rotor (3) side, and viscous fluid filled in said first and second chambers (R1, R2), a cam mechanism (7) for allowing movement of said piston (4) from said second chamber (R2) side to said first chamber (R1) side when said rotor (3) is rotated in one direction and for allowing movement from said first chamber (R1) side to said second chamber (R2) side when said rotor (3) is rotated in the other direction being disposed between said rotor (3) and said piston (4), wherein a cam member (5) is disposed within said first chamber (R1) such that said cam member (5) is non-movable in the axial direction of said receiving hole (23) but rotatable, said cam member (5) is non-rotatably connected to said rotor (3), a second cam mechanism (10) for allowing movement of said piston (4) from said second chamber (R2) side to said first chamber (R1) side by said cam mechanism (7) when said rotor (3) is rotated in one direction and for allowing movement of said piston (4) from said first chamber (R1) side to said second chamber (R2) side when said rotor (3) is rotated in the other direction is disposed between said rotor (3) and said piston (4), and amounts of movement of said piston (4) corresponding to rotation of said rotor (3) by said second cam mechanism (10) and said cam mechanism (7) are set to be equal.

2. A rotary damper according to claim 1, wherein there are provided a communication path (8) for flowing the viscous fluid without any resistance and a resistance path for flowing the viscous fluid with a predetermined value of resistance, between said first chamber (R1) and said second chamber (R2), and a stop valve (9) for opening said communication path (8) when the viscous fluid flows in one direction within said communication path (8) and for closing said communication path (8) when the viscous fluid flows in the other direction within said communication path (8) is disposed at said communication path (8).

3. A rotary damper according to claim 2, wherein an adjustment member (12) for adjusting a flow path area of said resistance path is disposed at said resistance path such that said adjustment member (12) can be operated from outside.

4. A rotary damper according to claim 3, wherein said piston (4) has a through hole (45) formed in a central area thereof and extending therethrough in an axial direction thereof, and said rotor (3) and said cam member (4) are non-rotatably connected to each other through a connection shaft (52) rotatably inserted into said through hole (45).

5. A rotary damper according to claim 4, wherein said resistance path includes a first hole (54) extending through a central area of said cam member (5) in an axial direction thereof, a second hole (54) extending through a central area of said connection shaft (52) in an axial direction thereof, and a lateral hole (55) extending from said second hole (54) to an outer peripheral surface of said connection shaft (52) facing said second chamber (R2), an insertion hole (35) is formed in a central area of said rotor (3) in such a manner as to extend therethrough in an axial direction thereof, and said adjustment member (12) is inserted at least into said second hole (54) from an external opening portion of said insertion hole (35).

6. A rotary damper according to claim 2, which further comprises inlet paths (34, 54) communicating with said first chamber (R1) or said second chamber (R2) from outside, and wherein said inlet paths (35, 54) are provided, in the form of a seal, with an amount adjusting member (14), whose insertion amount into said inlet paths (35, 54) can be operated from outside.

7. A rotary damper according to claim 6, wherein said piston (4) has a through hole (45) formed in a central area thereof and extending therethrough in an axial direction thereof, and said rotor (3) and said cam member (4) are non-rotatably connected to each other through a connection shaft (52) rotatably inserted into said through hole (45).

8. A rotary damper according to claim 7, wherein said inlet paths (35, 54) includes a first hole (54) extending through a central area of said cam member (5) in an axial direction thereof, a second hole (54) extending through a central area of said connection shaft (52) in an axial direction thereof, and an insertion hole (35) extending through a central area of said rotor (3) in an axial direction thereof, and said amount adjusting member (14) is inserted into said inlet path from an external opening portion of said insertion hole (35).

9. A rotary damper according to claim 2, wherein said piston (4) has a through hole (45) formed in a central area thereof and extending in an axial direction thereof, and said rotor (3) and said cam member (4) are non-rotatably connected to each other through a connection shaft (52) rotatably inserted into said through hole (45).

10. A rotary damper according to claim 1, wherein said piston (4) has a through hole (45) formed in a central area thereof and extending in an axial direction thereof, and said rotor (3) and said cam member (4) are non-rotatably connected to each other through a connection shaft (52) rotatably inserted into said through hole (45).

* * * * *

UNITED STATES PATENT AND TRADEMARK OFFICE
CERTIFICATE OF CORRECTION

PATENT NO.   : 6,634,033 B2
DATED        : October 21, 2003
INVENTOR(S)  : Tsuyoshi Mizuno, Kazuyoshi Oshima and Youjirou Nakayama It is certified that error appears in the above-identified patent and that said Letters Patent is hereby corrected as shown below:

<u>Column 12,</u>
Line 32, delete "between said rotor (3)" and amend to -- between said cam member (5) --.

Signed and Sealed this

Twenty-sixth Day of April, 2005

JON W. DUDAS
*Director of the United States Patent and Trademark Office*